ANDOR T. NOGRADY.
DIFFERENTIAL GEARING.
APPLICATION FILED AUG. 6, 1917.
1,262,833.
Patented Apr. 16, 1918.
2 SHEETS—SHEET 1.
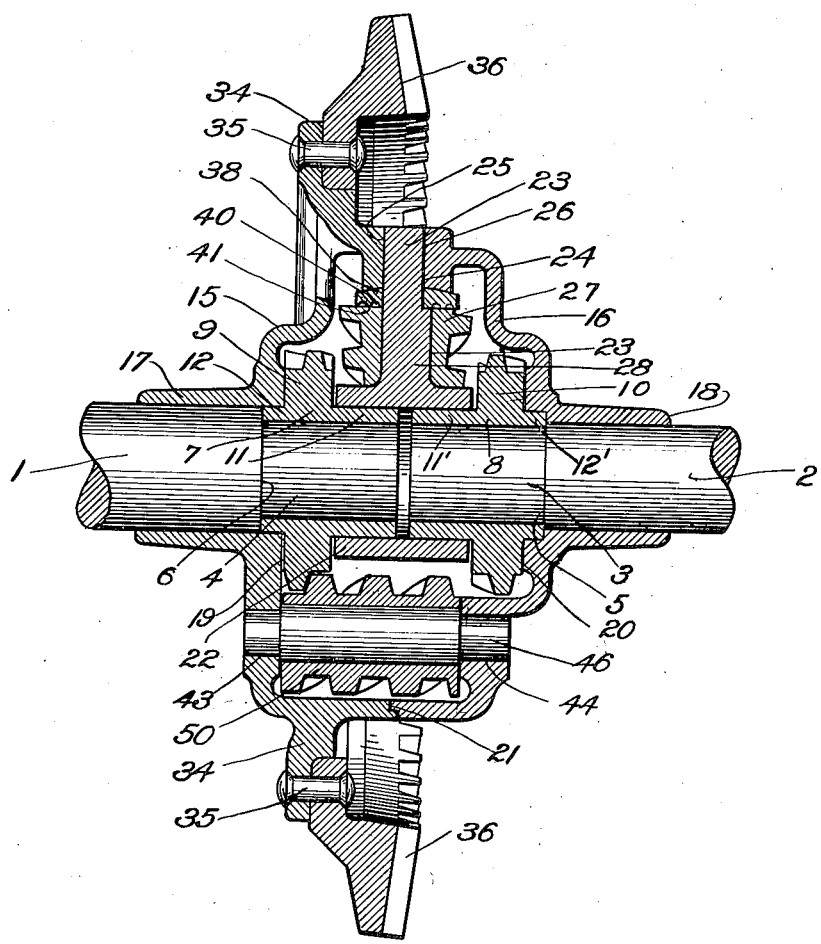
Fig. I.
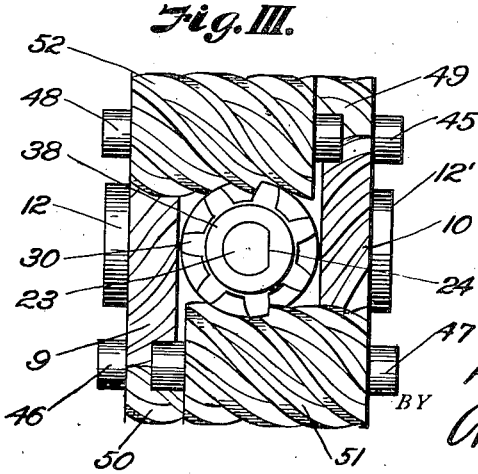
Fig. III.
INVENTOR.
AnDor T. Nogrady
BY
ATTORNEY

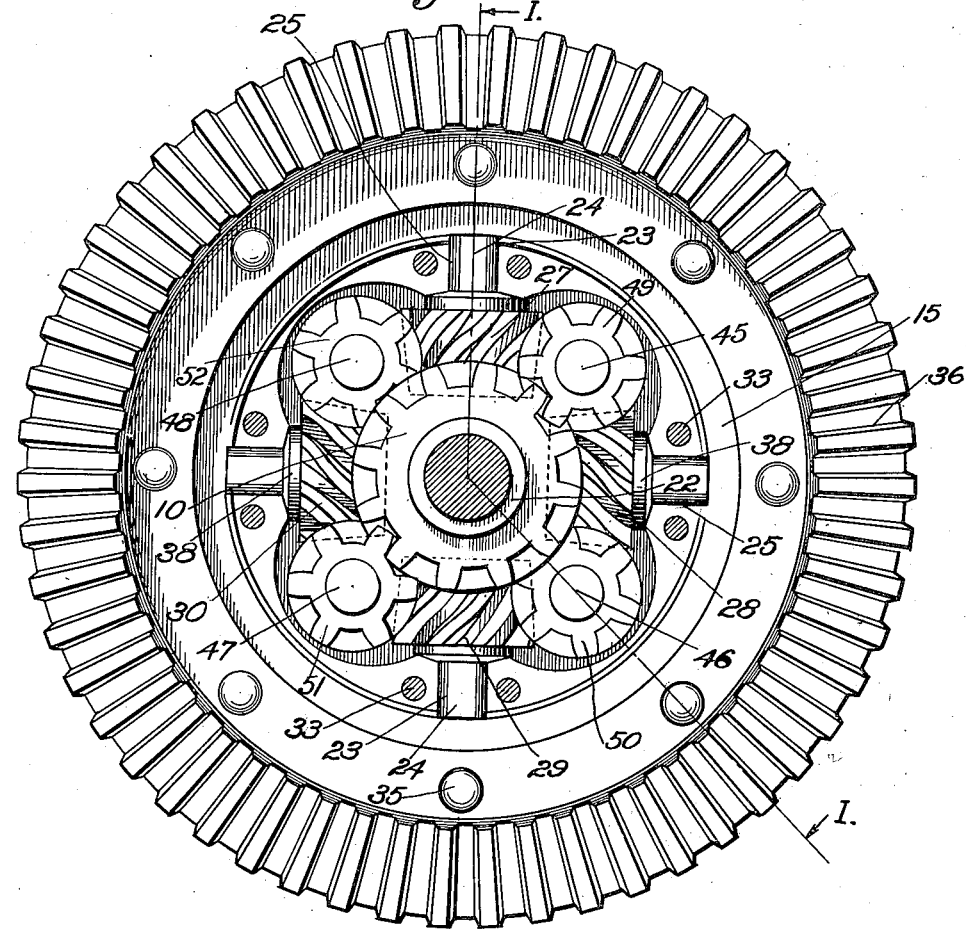

UNITED STATES PATENT OFFICE.

AN DOR T. NOGRADY, OF WICHITA, KANSAS.

DIFFERENTIAL GEARING.

1,262,833.　　　　　　　　Specification of Letters Patent.　　Patented Apr. 16, 1918.

Application filed August 6, 1917. Serial No. 184,638.

*To all whom it may concern:*

Be it known that I, AN DOR T. NOGRADY, a citizen of the United States, residing at Wichita, in the county of Sedgwick and State of Kansas, have invented certain new and useful Improvements in Differential Gearing; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to differential gearing and more particularly to mechanism for interposition in the driving axle of a motor driven vehicle, whereby driving force may be applied to the ground wheels on such axle and whereby variation in speed of the wheels is permited.

It is well known that differential gearing is necessary and has been in use on motor vehicles since the inception of the automobile art; the best known form and commonly used type of gearing consisting of the combination with a divided driving axle of master and supplemental gear wheels, whereby both of the axle members are driven equally while the vehicle is traveling in a straight line and whereby one of the wheels is driven faster than the other, as when the vehicle is turning a corner.

While different types of differential gearing have, in the past, supplied the needs of motor vehicles, some of such types contain objectionable features, such for instance as the application of all of the traction to the fastest moving wheel, and radial thrust on the differential, and it is to overcome these objectionable features that I have devised the present improvement.

More specifically it is the object of the present invention to provide a differential gearing whereby both members of the divided axle are driven from a master gear when the vehicle is in straight line travel, and whereby driving force is applied to a ground wheel having retarded motion, in order to propel the vehicle from the wheel having the greatest tractive force and relieve the free wheel from spinning and its resultant waste in tire wear; this result being secured by mechanism that places a driving thrust on the retarded ground wheel through the differential gearing.

It is a further object of the invention to provide a gearing of this character whereby radial thrust from the differential gear wheels is balanced in the differential, thereby relieving the master gear and the differential members, with their mountings, from radial thrust and its resultant retarding and wearing effect.

In accomplishing these and other objects of the invention, I have provided improved details of structure, the preferred forms of which are illustrated in the accompanying drawings, wherein:

Figure I is a sectional view, on the line I—I, Fig. II, of differential gearing constructed according to the present invention.

Fig. II is a side view of the same.

Fig. III is a side view of the gearing.

Fig. IV is a detail perspective view of the differential collar and spindles.

Fig. V is a perspective view of one of the locking gear wheel washers.

Referring more in detail to the drawings: 1—2 designate independent sections of a divided driving axle, the inner ends of which terminate closely adjacent to each other at about the center of the vehicle upon which the axle is mounted and have reduced tips 3—4, forming the shoulders 5—6 near the ends of the respective axle sections.

Fixed on the tips 3—4 of the axle 1—2 are sleeves 7—8, the inner ends of which terminate flush with the inner ends of the axle, the respective sleeves being provided with integral gear members 9—10, preferably of the spiral type; the gear members being arranged near the outer ends of the sleeves 7—8 in order to provide relatively long inner bearing portions 11—11' and short outer bearing portions 12—12'.

Located at opposite sides of the differential are the inclosing housing cups 15—16, having bearing sleeves 17—18 rotatably mounted on the axle portions 1—2 and on relatively short bearings 12—12' of the adjacent gear sleeves 7—8; the housing cups having shouldered parts 19—20 for bearing against the outer faces of the gear members of said collars to retain the latter in position, and having a mortised or like joint 21 to hold the inclosing housing cups 15—16 in alinement with each other.

Rotatably mounted on the relatively long bearing portions 11—11' of the respective sleeves 7—8, and bridging the space therebetween, is a collar 22 (Fig. IV), and radiating from such collar at ninety degree angles are the spindles 23, each of which has a flat face 24 at its outer end for engagement in the socket 25—26 in the mating housing cups 15—16, to lock washers (presently described) on the spindles; the inner portions 28 of said spindles being circular to form a bearing for interlocking bevel gear wheels 27, 28, 29, and 30, and the housing cups being connected by bolts 33, or other suitable means, so that when the parts are assembled the spindles 23 and the rest of the differential mechanism may be retained in proper relation.

One of the housing cups, here shown to be the cup 15, has a projecting flange 34 and fixed to said flange preferably by bolts 35, is a gear ring 36, which constitutes the master gear of the differential and may be driven by any suitable transmission (not shown) from the motor of the vehicle.

In order to mount the locking gear wheels 27, 28, 29, and 30, so that they will have a minimum of friction against the housing bearings, and to provide for lubrication and for quick locking and unlocking of the differential, as presently described, I locate washers 38 on the respective spindles 23 at the ends of the locking gear wheels, the said washers having flat faces 39 engaging the flat faces 24 of the spindles to prevent rotation of the washers, and having corrugated inner faces providing grooves 40 and ribs 41, for containing lubricant, and limited bearing of the washers against the ends of the gear wheels.

Rotatably mounted in bearings 43—44 in the respective housing cups 15—16 are shafts 45—46—47 and 48, and formed integrally on said shafts are elongated spiral members 49, 50, 51, and 52, of the same type as the gear wheels 27, 28, 29, and 30, the said shafts 45, 46, 47, and 48 being also arranged at ninety degree angles and interposed between the first named gear members so that each of the members 49, 50, 51, and 52 meshes with two of the gear wheels 27, 28, 29, and 30 to form a continuous chain of gears around the driving axle.

The gear wheels 49, 50, 51, and 52 are paired, in that two of them mesh with the gear wheel on one of the driving axle sections and the other two mesh with the gear wheel on the opposite axle section, the drawing showing the gear wheels 49 and 51 meshing with the right hand section 2 and the other pair, 50 and 52, meshing with the opposite section 1, this paired arrangement being effected by offsetting the portions of the housing cups 15 and 16 at the points containing alternate bearing portions sufficiently to allow the gear members to terminate short of the offset wheels and at points inset from the driving axle gears so that the differential gear members may contact with the proper driving axle members.

In order to balance the driving stress between the differential gear members and the driving axle members, I locate the members of the differential pairs on opposite sides of the driving axle gear wheels, as illustrated, so that such differential gear wheels thrust against diametrically opposite points on the driving axle gear wheels and thereby serve to hold sections of the driving axle in alinement under the driving pressure; it being apparent that one pair of the differential gears may engage opposite points of one of the driving axle gear wheels and the other pair engage diametrically opposite points on the other gear wheel of the other axle section, while each differential gear wheel engages two adjacent locking gear wheels, also at ninety degree angles.

By providing the double pair of differential gear wheels 49, 50, 51 and 52, I not only secure a balanced thrust on the driving axle gear wheels, but I also balance the thrust on the differential gear wheels, themselves and balance the radial thrust on the entire mechanism, as it is apparent that with each differential gear wheel rotating in mesh with adjacent locking gear wheels, the action of two opposite locking gear wheels, tends to push the differential gear wheel away from the axial center of the mechanism, whereas rotation of the other two opposite locking gear wheels with adjacent differential gear wheels acting in the opposite direction, tends to pull the differential gear wheels toward such axial center, the two thrust actions balancing, for the reason that the gears are all connected in train so that the outward thrust of one is counteracted by the inward thrust of the other.

While each of the differential gear wheels has a thrust balance within itself, such gear wheels act in double pairs to balance the general thrust on the entire mechanism, as it is apparent that with the differential in motion the pair made up of the differential gear wheels 49 and 52 tends to thrust the locking gear wheel 27 inwardly toward the axis and the gear wheels 50 and 51 likewise act on the locking gear wheel 29 to thrust it toward the axis, so that the thrust is balanced at the axial point and there is no tendency of the parts to move in one direction as would be the case if there was no offsetting thrust on the locking gear wheels. The other double pair of balancing members constituting the gear wheels 49 and 50 which act on the locking gear wheel 28 to thrust the latter outwardly and the differential gear wheels 51 and 52 which have a like effect on the locking gear wheel 30; it being apparent that as the first double pair thrusts inwardly and the last double pair thrusts outwardly, and in view of the fact that all of the gear wheels are connected in train, the thrust or balance has no greater tendency to push any of the parts in one direction more than in another.

Assuming that the parts are constructed and assembled as described, and in use on the driving axle of an ordinary motor vehicle and with the master gear connected in a suitable manner with the motor by which the vehicle is driven, when the vehicle is driven in a direct path the action on the master gear through the transmission rotates the master gear. As the spindles of the cross frame on the collar 22 have fixed relation to the master gear wheel, the cross frame with the locking gear wheel rotates about the ends of the driving axle sections. The differential gear wheels 49 to 52 inclusive, meshing with the locking gear wheels 27 and 28, are locked thereto so that they cannot rotate on the driving axle and the independent axle sections are moved as a solid axle.

Assume further that the vehicle carrying the differential encounters a soft spot in the road, grass land, or slippery surfaces: In an ordinary differential mechanism this would mean that as the power would follow the line of least resistance, the wheel on section 1 would over-run the wheel on section 2, so instead of pulling the wheel having the most substantial footing the power would be applied to the spinning wheel. With the present mechanism, however, this action is partly reversed in that as the motor continues to actuate the master gear wheel the latter is revolved about the axle sections as before and the teeth of the locking wheels are pushed tightly against the teeth of the differential gear wheels. As the differential is well lubricated by reason of running in oil in the housing, this pressure of the meshing gear wheels on each other has no immediate effect and the differential gear wheels meshing with the gear wheel on the axle section, having retarded travel, rotate about the gear wheel on the retarded axle section as in the ordinary differential and allow the power to be applied to the free axle section. This pressure, however, very quickly squeezes the oil from between the meshing gear teeth in the differential train, so that friction of the dry gear teeth induces a locking effect that retards or completely stops the rotary movement so that all of the differential gear wheels drag on the locking gear wheels and the driving force is exerted from the master gear wheel on the retarded ground wheel as well as on the free wheel. Not only is the drag effected by squeezing oil from between the meshing gear wheels, but such action is supplemented by pressure of the outer ends of the locking gear wheels against the washers 38, which tends to squeeze the oil from between the ends of the locking gear wheels and the washer ribs 41 into the grooves 40, so that a drag is effected at these points. It is apparent, however, that as soon as the drag or locking effect is relieved, the back lash separates the gear teeth sufficiently to permit oil to flow back between the teeth so that the normal action is resumed.

Having thus described my invention, what I claim as new therein, and desire to secure by Letters Patent, is:

1. In combination with axle sections, a gear wheel on each axle section, a master gear member rotatable about the axle, and a circular train of intermeshing gear wheels rotatably mounted in the master gear member, with separate members of the train meshing with the separate axle gear wheels, to drive the axle sections equally by thrust from the master gear or differentially by rotation of gears of the circular train about one of the axle gears.

2. In combination with alined axle sections, a gear wheel on each section, a master gear member rotatable about the axle sections, and a circular train of eight intermeshing gear wheels rotatably mounted on the master gear wheel and each rotatable on its own axis, the said train comprising members in mesh with the gears on the axle sections and locking gears alternating with said members.

3. In combination with alined axle sections, a gear wheel on each axle section, a master gear member rotatable about the axle, separate gear wheels, each mounted on the master gear member to rotate on its own axis and about one of the axle section gears, and locking gear wheels, each mounted on the master gear wheel to rotate on its own axis and meshing with adjacent separate gears, whereby a circular train of gears is provided within the master gear and about the axle sections.

4. In combination with alined axle sections, a gear wheel on each axle section, a master gear member rotatable about the axle, separate gear wheels, each mounted on the master gear member to rotate on its own axis and about one of the axle section gears, and locking gear wheels, each mounted on the master gear wheel to rotate on its own axis and meshing with adjacent separate gears, whereby a circular train of gears is provided within the master gear and about the axle sections, the train being continuous to balance thrusts within the gearing.

5. In combination with alined axle sections, a gear wheel fixed on each section, a master gear member rotatable about the axle sections, a pair of gear wheels mounted in the master gear member and meshing with the gear wheel on one of the axle sections, a second pair of gear wheels mounted in the master gear member and meshing with the gear wheel on the other axle section, and locking gear wheels interposed between and meshing with adjacent gear wheels of said pairs.

6. In combination with alined axle sections, a gear wheel fixed on each section, a master gear member rotatable about the axle sections, a pair of gear wheels mounted in the master gear member and meshing with the gear wheel on one of the axle sections, a second pair of gear wheels mounted in the master gear member and meshing with the gear wheel on the other axle section, and locking bevel gear wheels interposed between and meshing with adjacent gear wheels of said pairs.

7. In combination with alined axle sections, a gear wheel fixed on each section, a master gear member rotatable about the axle sections, a pair of gear wheels mounted in the master gear member and meshing with the gear wheel on one of the axle sections, a second pair of gear wheels mounted in the master gear member and meshing with the gear wheel on the other axle section, and locking bevel gear wheels interposed between and meshing with adjacent wheels of said pairs, the wheels of the said pairs being on opposite sides of the axle and each locking gear wheel in operative relation to one of the gear wheels in each pair.

In testimony whereof I affix my signature.

AN DOR T. NOGRADY.